US011426786B2

(12) United States Patent
Bogliacino et al.

(10) Patent No.: US 11,426,786 B2
(45) Date of Patent: Aug. 30, 2022

(54) EQUIPMENT AND METHOD FOR FORMING A FRONT TOOTHING ON AN INNER RING OF A WHEEL HUB

(71) Applicant: Aktiebolaget SKF, Gothenburg (SE)

(72) Inventors: Fabio Bogliacino, Cortemilia (IT); Alessandro Ferrero, Turin (IT); Giorgio Missiaggia, Trieste (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/353,603

(22) Filed: Jun. 21, 2021

(65) Prior Publication Data
US 2021/0402460 A1    Dec. 30, 2021

(30) Foreign Application Priority Data
Jun. 25, 2020   (IT) .................. 102020000015166

(51) Int. Cl.
| | | |
|---|---|---|
| *B21J 13/02* | (2006.01) | |
| *B21K 1/30* | (2006.01) | |
| *B21J 5/12* | (2006.01) | |
| *B21J 9/02* | (2006.01) | |
| *B21K 21/12* | (2006.01) | |

(52) U.S. Cl.
CPC ................ *B21J 5/12* (2013.01); *B21J 9/025* (2013.01); *B21J 13/02* (2013.01); *B21K 1/30* (2013.01); *B21K 21/12* (2013.01)

(58) Field of Classification Search
CPC ... B21J 5/12; B21J 9/025; B21J 13/02; B21K 1/30; B21K 21/12; B21K 1/40; B60B 27/0031; B60B 31/00; F16B 1/00; B60R 21/261; F16C 43/04
See application file for complete search history.

(56) References Cited

U.S. PATENT DOCUMENTS

| 4,893,960 A | 1/1990 | Beier et al. |
|---|---|---|
| 2013/0174422 A1* | 7/2013 | Bosco ................. F16C 43/04 29/894.361 |

FOREIGN PATENT DOCUMENTS

| EP | 2422995 | 2/2012 | |
|---|---|---|---|
| EP | 2551032 | 1/2013 | |
| EP | 2551034 | 1/2013 | |
| EP | 3323525 | 5/2018 | |
| EP | 3323525 A1 * | 5/2018 | ............. B21D 39/00 |

OTHER PUBLICATIONS

Search Report for corresponding Italian Patent Application No. 2020000015166 dated Mar. 8, 2021.

* cited by examiner

*Primary Examiner* — Lee A Holly
(74) *Attorney, Agent, or Firm* — Reed Smith LLP

(57) ABSTRACT

Equipment including a rigid plate provided with a plurality of cutters configured to be impressed in sequence against a swaged annular collar of an inner ring of a wheel hub, the collar being formed with a first radial profile; the cutters sliding axially through the plate and towards a first face of the plate resting in abutment against the collar; wherein the first face of the plate is provided in the region of the cutters with a concave annular seat having a second radial profile configured to copy at least partly the first radial profile of the collar, the annular seat being configured to be passed through by the cutters during the step for impression against the collar and to contain any radial flow of the metallic material which forms the collar.

8 Claims, 6 Drawing Sheets

EQUIPMENT AND METHOD FOR FORMING A FRONT TOOTHING ON AN INNER RING OF A WHEEL HUB

CROSS-REFERENCE RELATED APPLICATIONS

This application is based on and claims priority to Italian Patent Application No. 102020000015166 filed on Jun. 25, 2020, under 35 U.S.C. § 119, the disclosure of which is incorporated by reference herein.

FIELD

The present disclosure relates to improved equipment and to an associated method for forming by plastic deformation a front toothing on an inner ring of a wheel hub.

BACKGROUND

In types of wheel hubs front toothing has the purpose of coupling end-to-end the inner ring of the wheel hub with a corresponding front toothing of an outer ring of a constant-velocity joint, in order to ensure transmission of torque from the constant-velocity joint to the inner ring of the wheel hub, which carries a wheel of the vehicle by means of a flanged end thereof.

DESCRIPTION OF THE DRAWINGS

Further characteristic features and advantages of the present invention will become clear from the description below of two non-limiting examples of embodiment thereof, provided with reference to the figures of the attached drawings, in which.

DETAILED DESCRIPTION

Figure 1:
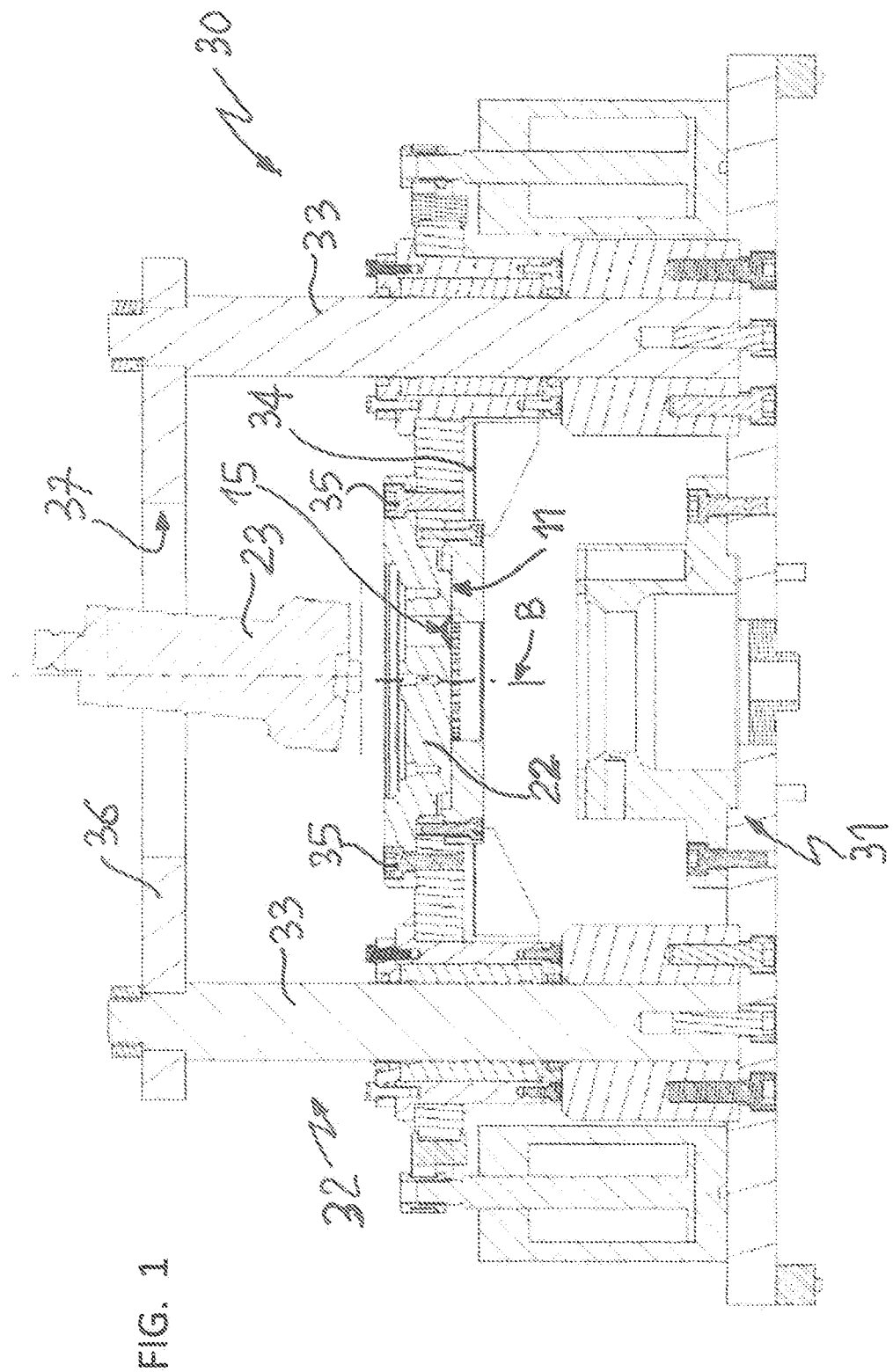
FIG. 1 shows in schematic form an elevation and radially sectioned view of equipment provided in accordance with the invention and designed to form by plastic deformation a front toothing on an inner ring of a wheel hub.

The subject matter of the present disclosure is applicable to a wheel hub, the inner ring of which comprises a stub axle, provided with a first raceway for a first row of rolling bodies, and an "insert" ring, provided with a second raceway for a second row of rolling bodies, wherein the insert ring is axially locked on the stub axle by means of a swaged collar, defined by end section of the stub axle which has been plastically deformed.

A coupling is described in U.S. Pat. No. 4,893,960 which also teaches how to form front toothing on an inner ring of a wheel hub. In particular, front toothing is formed using the so-called "orbital forming" method simultaneously with forming of the swaged collar, by means of a tool including a frustoconical element which swages the collar and a frontally toothed tubular element which is mounted slidably axially on the outside of the frustoconical element and which impresses the toothing on the collar still being deformed. An element radially on the outside of the toothed tubular element, which may form part of the same tool or form a second separate tool, controls the deformation of the collar radially towards the outside.

A forming method such as that described in U.S. Pat. No. 4,893,960, although satisfactory for some applications, nevertheless requires the use of a relatively complex tool and, in particular, is unable to ensure the formation of teeth with characteristics of a high uniformity of the tooth profile, which is absolutely necessary in view of the increasingly high torques which must be transmitted.

The aforementioned problems have been solved by using for the impression of the front toothing a plurality of cutters which are impressed in sequence on the swaged collar, each moving independently of each other, such that it is possible to obtain by means of plastic deformation front toothing in which the profile of the teeth remains substantially uniform, while ensuring at the same time a greater dimensional precision of the teeth thus obtained.

However, during assembly of the wheel hub and the constant-velocity joint incorrect mating between one tooth and another may occur, which means that the teeth of the two components do not engage together correctly. This is due to the fact that the tip of the teeth obtained by means of orbital forming on the wheel hub instead of being fully rounded, as per the design specification, tend to become flattened during the forming process. This prevents, during use, the corresponding tooth of the constant-velocity joint from performing correct engagement inside one of the troughs between the teeth of the front toothing of the wheel hub, said troughs defining the bottom of the said front toothing.

Subsequently, teeth of a wheel hub/constant-velocity joint unit which has been incorrectly assembled, owing to the weight of the vehicle which receives it or during the first transmission of the torque from the constant-velocity joint to the vehicle wheel, naturally engage into the correct position, but, as a result of this, the central screw or nut which are used to lock together the two components immediately lose the tightening force which is imparted during assembly and frontal play may also form between the two engaging sets of teeth of the wheel hub and constant-velocity joint, even through the torque transmission is still ensured.

This results in a whistling noise along the axle, since the teeth jump out of the correctly engaged position whenever higher torques are transmitted, since the tightening force of the central screw is at least partially reduced.

In a vehicle affected by this condition, gradually the teeth become worn with a total loss of traction in the case of a 2WD (two wheel drive) vehicle since even only one side without traction prevents the traction of the entire vehicle owing to the mechanics of the axle differential. In an AWD vehicle, where the four driving wheels are not always engaged, there is instead a partial loss of traction for the vehicle.

In both cases, the gradual deterioration of the gears is possible if the driver does not detect the loss of power on an axle, since the control unit of the vehicle will not detect anomalous conditions in good time because the tractionless axle still generates a plausible ABS signal.

Figure 5:
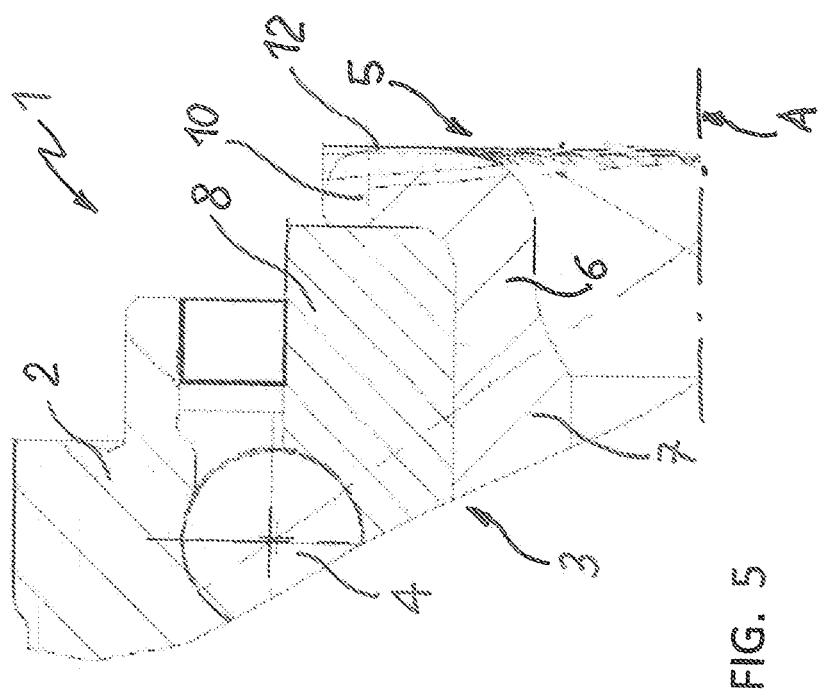
FIG. 5 shows in schematic form, for greater clarity, part of a wheel hub provided with a front toothing which can be obtained with the equipment according to FIG. 1.

With reference to FIG. 5, 1 denotes in its entirety a wheel hub, known per se and shown only partly for simpler illustration, comprising an outer ring 2 intended, during use, to be fastened in a known manner to a suspension upright (not shown) of a vehicle and an inner ring 3, between which two rows of rolling bodies 4 are arranged, only one of which is shown in FIG. 5.

The inner ring 3 can be operatively associated, during use, with a known constant-velocity joint, not shown for simpler illustration, by means of a front toothing 5 formed on a first end 6 thereof and is provided with a flange (known and not shown for simpler illustration) for attachment of a vehicle wheel on the opposite side to the end 6.

In the non-limiting example shown, the inner ring 3 comprises a stub axle 7 defining the end 6 and an "insert" ring 8 embedded in the end 6 which is directed, during use, towards the said constant-velocity joint; inner ring 3, stub axle 7 and insert ring 8 are coaxial with each other having a common axis of symmetry A which coincides with a general axis of symmetry of the entire wheel hub 1.

Figure 4:
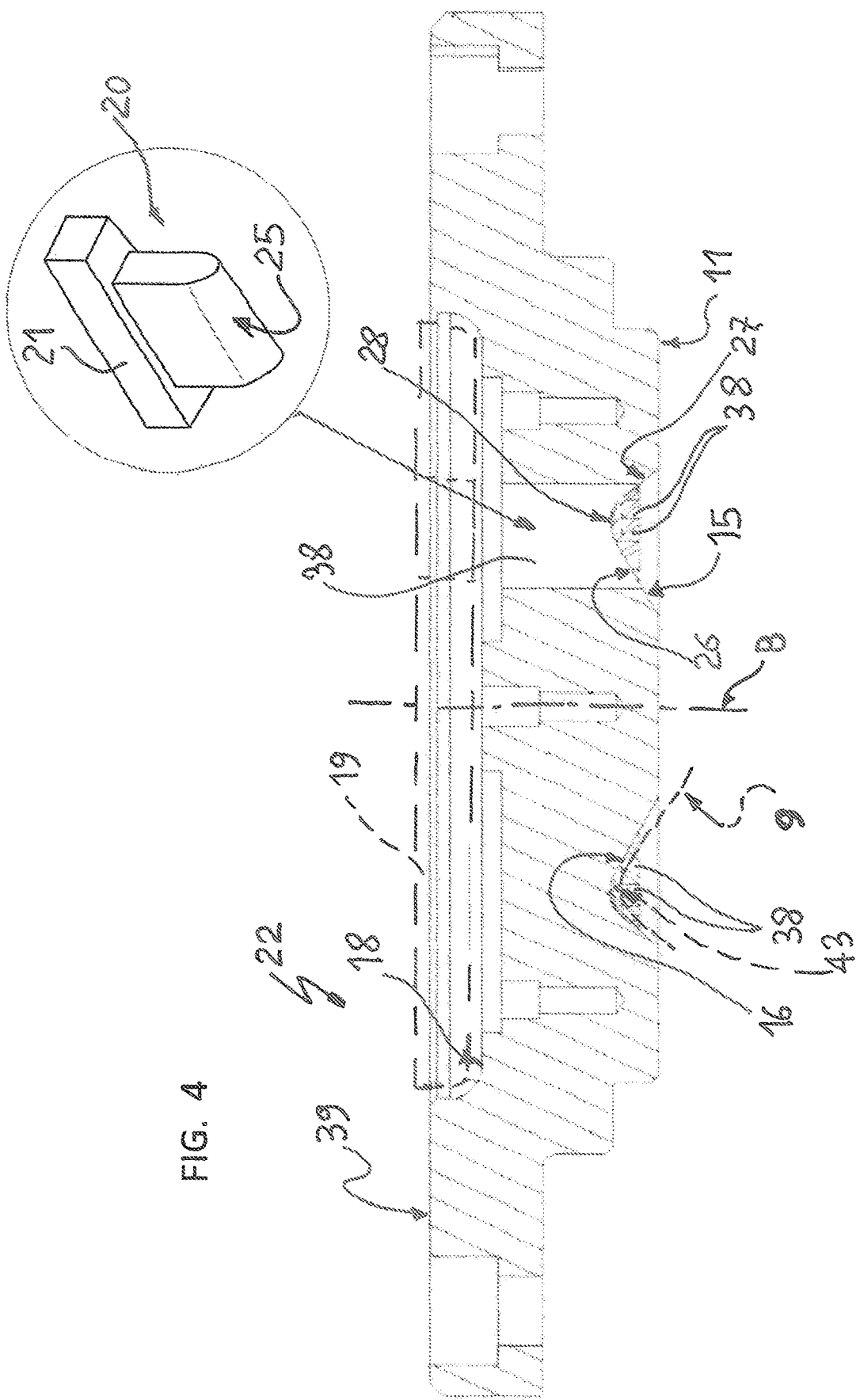
FIG. 4 shows in schematic form an elevation view cross-sectioned along a plane indicated by the line IV-IV of the component shown in FIG. 2 alongside another main component of the equipment according to FIG. 1.
Figure 7:
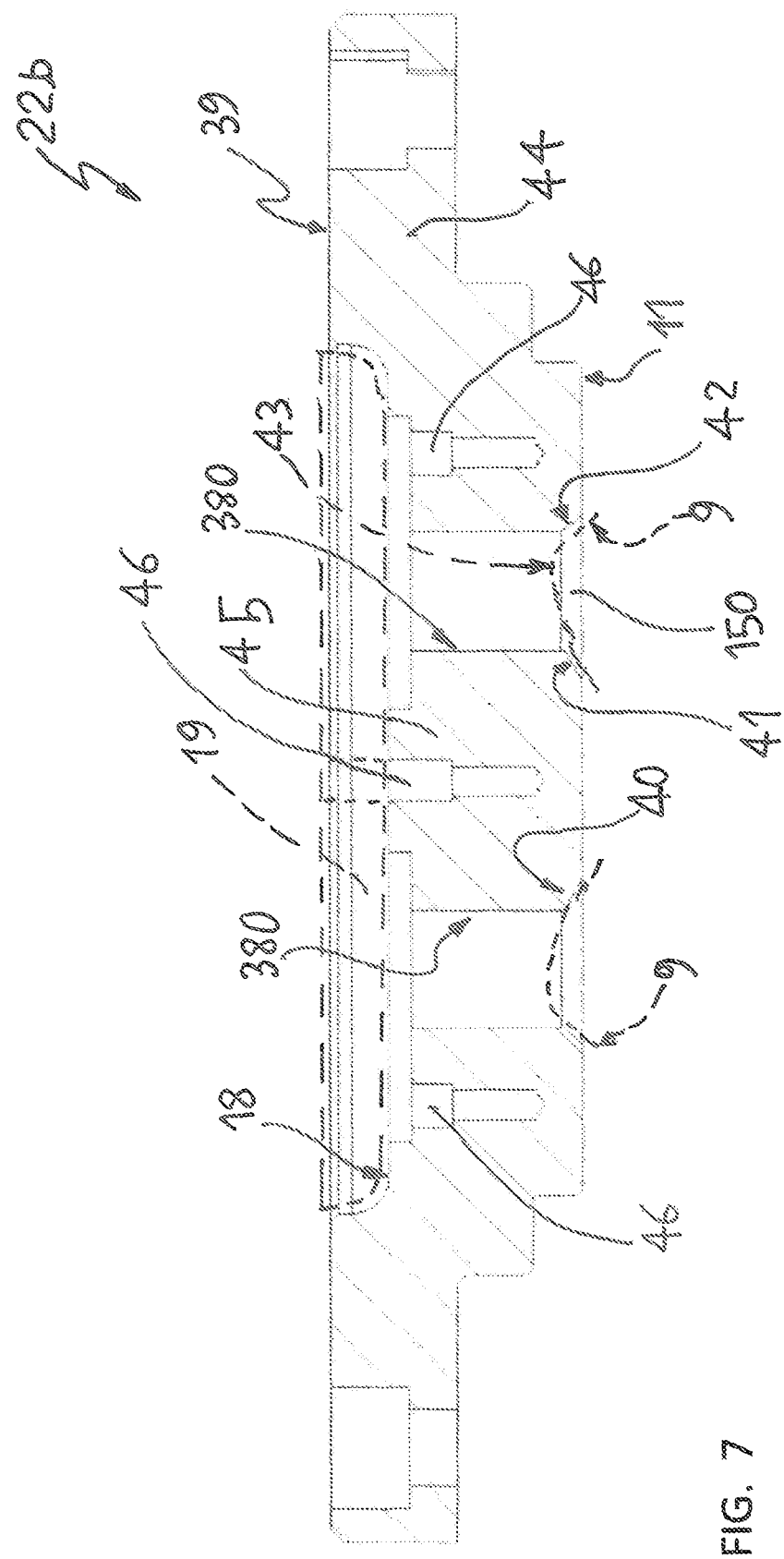
FIG. 7 shows in schematic form a radially sectioned front elevation view of the component according to FIG. 6.

Inner ring 3 is provided with a swaged collar 10 obtained by means of orbital forming by plastic deformation of a terminal end 6 and having a first predefined radial profile 9, shown schematically in broken lines in FIGS. 4 and 7.

In the non-limiting example of embodiment shown, ring 8 is axially locked onto the stub axle 7 by means of the swaged collar 10 which protrudes axially with respect to the ring 8.

In any case, collar 10 is provided with the front toothing 5 which is formed on a front end face 12 thereof arranged substantially perpendicular to the axis of symmetry A of the wheel hub 1, generally, and of the inner ring 3, in particular.

With reference now also to FIGS. 1 to 4, the front toothing 5 is obtained by means of plastic deformation orbital forming equipment 30 (FIG. 1) which is similar to that normally used for the (known) orbital forming of a collar, e.g., 10 on the inner ring 3 of a wheel hub 1.

Equipment 30 comprises a base 31 and a substantially rigid plate 22 (FIGS. 2-4) having an axis of symmetry B and carrying, slidably parallel to the axis of symmetry B, a plurality of cutters 20, only one of which is schematically shown in a perspective view in FIG. 4, for simpler illustration.

Cutters 20 are arranged in a ring-like manner and are mounted on a plate 22 movably, more specifically axially slidably, parallel to the axis B, through the said plate.

Plate 22 is in turn mounted on base 31, movable axially along the axis of symmetry B, and base 31 is configured to rigidly receive wheel hub 1 with inner ring 3 angularly locked and collar 10 facing a first face 11 of plate 22 directed towards base 31.

In particular, a base 31 supports a frame 32 formed in the manner of a gantry and comprising pylons 33, preferably arranged vertically, along which a crosspiece 34 supporting removably, for example by means of screws 35, the plate 22 with the cutters 20, slides parallel to the axis B.

The frame 32 also comprises a fixed crosspiece 36 which is mounted crosswise on the top of the pylons 33 and is provided with a through-opening 37 inside which a tool formed by a—known—orbital forming pressing head 23, delimited at the front by a conical surface 24, may be lowered.

Figure 2:
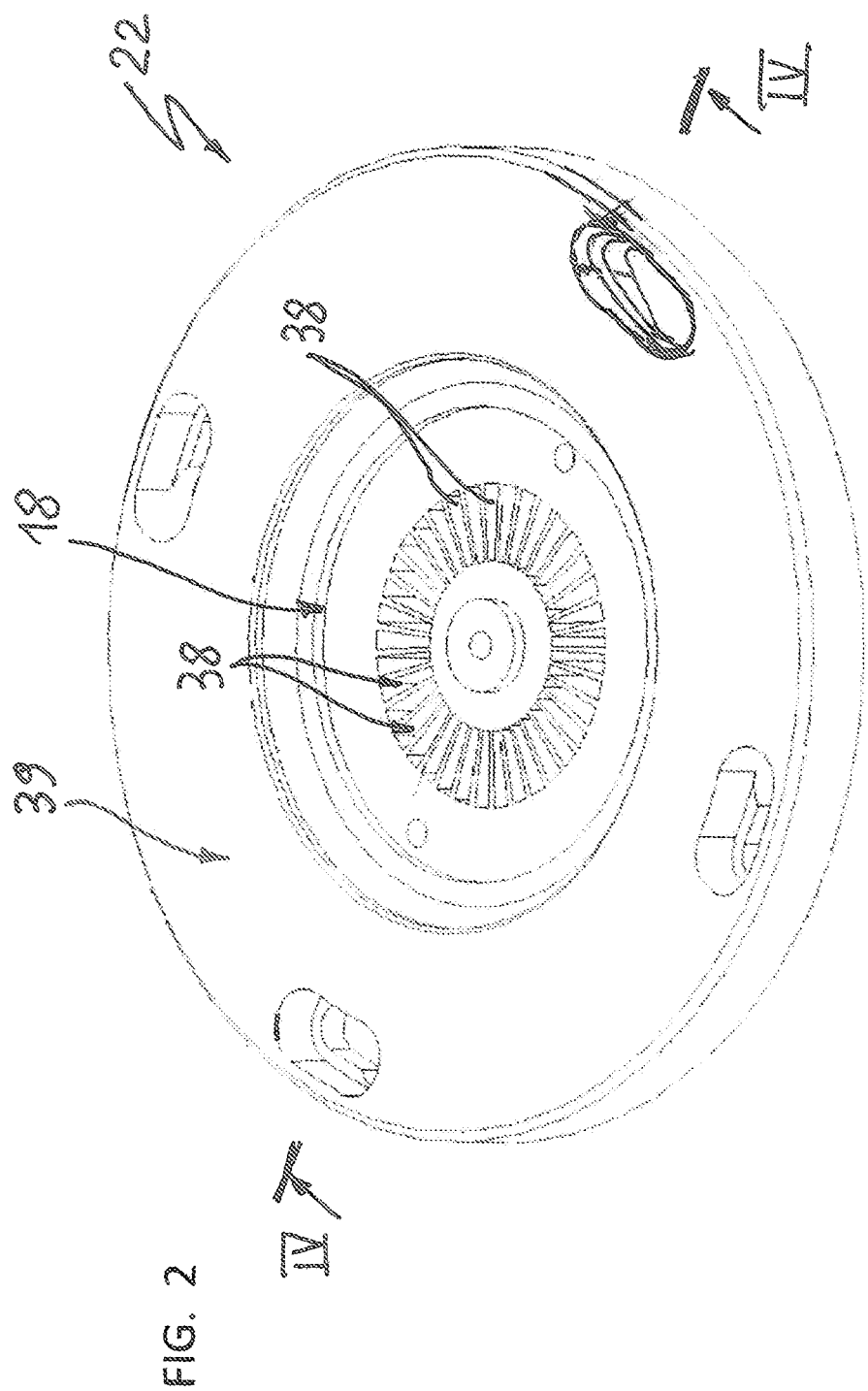
FIG. 2 shows in schematic form, on a larger scale, a perspective three-quarters view from above of a main component of the equipment according to FIG. 1.

The cutters 20 (FIG. 4) are guided substantially without play inside respective seats 38 of the plate 22, consisting of slots formed passing through plate 22 and configured (i.e., formed and arranged) as segments of a circular crown (FIG. 2).

Cutters 20 are also provided on the opposite side to the face 11 with respective heads 21 which have radial and circumferential dimensions greater than those of the cutters 20 so as to prevent them from "falling" out of the plate 22 through the slots 38.

During use, the head 23 is pressed with its conical surface 24 against the heads 21 of the cutters 20.

By rotating head 23 about an axis arranged inclined with respect to the axis B of symmetry of plate 22 and coinciding, during use, with the axis A of the wheel hub 1 mounted locked on the base 31 and by simultaneously rotating this inclined axis of the head 23 with a precession movement, about the axes B and A, cutters 20 are pressed selectively and in sequence, preferably one at a time, against collar 10 previously formed by means of swaging using equipment similar to the equipment 30.

Ring 3 is in fact directly supported rigidly by the base 31 and therefore cannot either move or be rotationally driven.

According to the main aspect of the invention, a first face 11 is provided in a region of cutters 20 with a concave annular seat 15 (FIG. 4) having a second radial profile 16 configured to copy totally or at least partly a first radial profile 9 of collar 10, as schematically shown in FIG. 4.

Profile 9 is specifically designed and made with great precision during the operation for forming collar 10, from metallic material constituting inner ring 3 and in particular on a side where end 6 is situated. Profile 16, consequently, may be easily made so as to "copy" profile 9, namely mate with profile 9.

Therefore, during forming of toothing 5, which is obtained by impressing cutters 20 against previously formed collar 10, annular collar 10 is entirely housed inside annular seat 15, with profile 5 resting against profile 9 or separated from it with a minimum clearance ("minimum" being understood as being a parameter of the order of tenths of a mm). Preferably, this minimum clearance is mainly present in the axial direction.

For this purpose, first face 11 is configured to rest during use substantially abutting against inner ring 3 of wheel hub 1.

Annular seat 15 is also configured to be passed through by cutters 20 as a result of a sliding movement thereof inside plate 22 and towards base 31, owing to the fact that seats or slots 38 extend from a top face 39 of plate 22, opposite and parallel to face 11, extend towards face 11 (bottom face in the example shown, where the axes A and B are arranged substantially vertical) and emerge inside annular seat 15.

A second face 39 is preferably provided with an inset surface 18 for housing a flat disc 19—shown in broken lines in FIG. 4—which is also provided with slots corresponding to seats 38 and against which heads 21 rest on the opposite side to inset surface 18.

Cutters 20 have circumferentially a profile complementing that of a front toothing 5 to be obtained so that each cutter 10 is able, when pushed against inner ring 3, to form on inner ring 3 a profile of a flank of two adjacent teeth of front toothing 5 to be obtained.

Disc 19, which is optional, is useful for supporting a set of cutters 20 already arranged in the desired positions, to be inserted in the seats 38. In this way it is possible to replace easily and very quickly cutters 20 which may be worn or replace cutters 20 which have a working end or tip or edge 25 with a first circumferential profile, with cutters 20 which have a working edge 25 with a second circumferential profile, different from the first profile, so as to impress/form teeth 5 with a different profile.

Working tips or edges 25 enter inside the annular seat 15 during axial sliding of the cutters 20 in plate 22 in order to plastically deform a previously swaged collar 10 and form toothing 5 thereon.

This axial sliding movement is produced by pressing head 23, which is lowered until it comes into contact, against heads 21 so as to cause selectively a sequential axial movement of cutters 20 towards a base 31 and against a collar 10 of an inner ring 3 of a wheel hub 1 arranged locked on base 31 after plate 22 has been arranged against inner ring 3.

During this plastic deformation step, metallic material from which the collar 10 is made "flows" forming the troughs and the single teeth of the front toothing 5 with the metallic material which is displaced.

During this step, differently from the prior art, however, metallic material being deformed is not left free to move radially, but is contained, at least in the radial direction, as will be seen, by the presence of annular seat 15.

Figure 3:
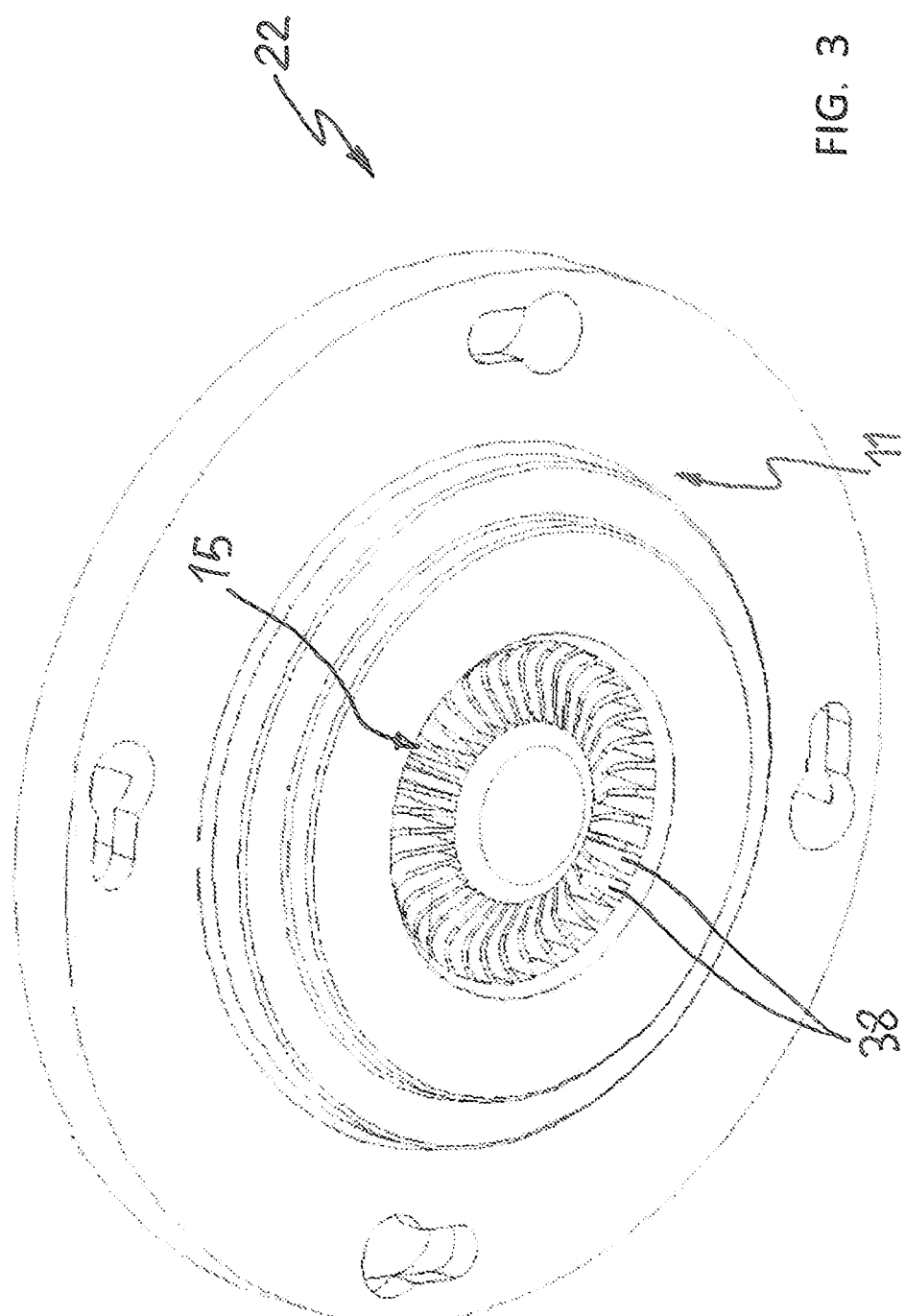
FIG. 3 shows in schematic form, on a larger scale, a perspective three-quarters view from below of the same main component of the equipment according to FIG. 1 already illustrated in FIG. 2.

FIGS. 2-4 show first embodiments of the annular seat 15.

According to this embodiment, a radial profile 16 of annular seat 15 which extends circumferentially in a uniform manner, is configured to "copy" entirely a radial profile 9 (i.e., to follow completely the contour) of collar 10 and annular seat 15 is formed by means of machining of a face 11, as are also slots 38.

Radial profile 16 (FIG. 4) therefore comprises a first radially inner section 26 having a shape matching a corresponding first radially inner section of profile 9 of a collar 10, a second radially outer section 27 having a shape matching a corresponding second radially outer section of the profile 9 and a third section 28 arranged so as to connect together the sections 26 and 27 and having a shape matching a corresponding third section 43 of the profile 9 delimiting the top thereof.

Cutters 20 are, as has already been seen, slidably housed inside a respective radial slots 38 passing axially through a plate 28, which are formed in a ring-like manner at least or, preferably, only along a third section 28 of profile 16 so as to intercept this third section 28 and interrupt at least in a region thereof the continuity of annular seat 15.

In this way, sections 26 and 27 may act as elements for radially containing the material of the collar 10 while the cutters 20 are impressed thereon.

Moreover, along the circumferential sections of annular seat 15 which are not provided with slots 38 (left-hand side of FIG. 4), a top section 28 of the profile also ensures axial containment of the material of the collar 10, while the cutters 20 are cutting into it.

Consequently, plastically deformed material of a collar 10 is contained both radially and axially during its plastic flowing movement by means of a predefined profile 16 which has been calculated according to the design specification.

As a result, surprisingly, it is possible to obtain toothing 5 with the top of the teeth perfectly rounded and in general teeth with a greater height for the same penetration, and therefore axial displacement, of the cutters 20.

Figure 6:
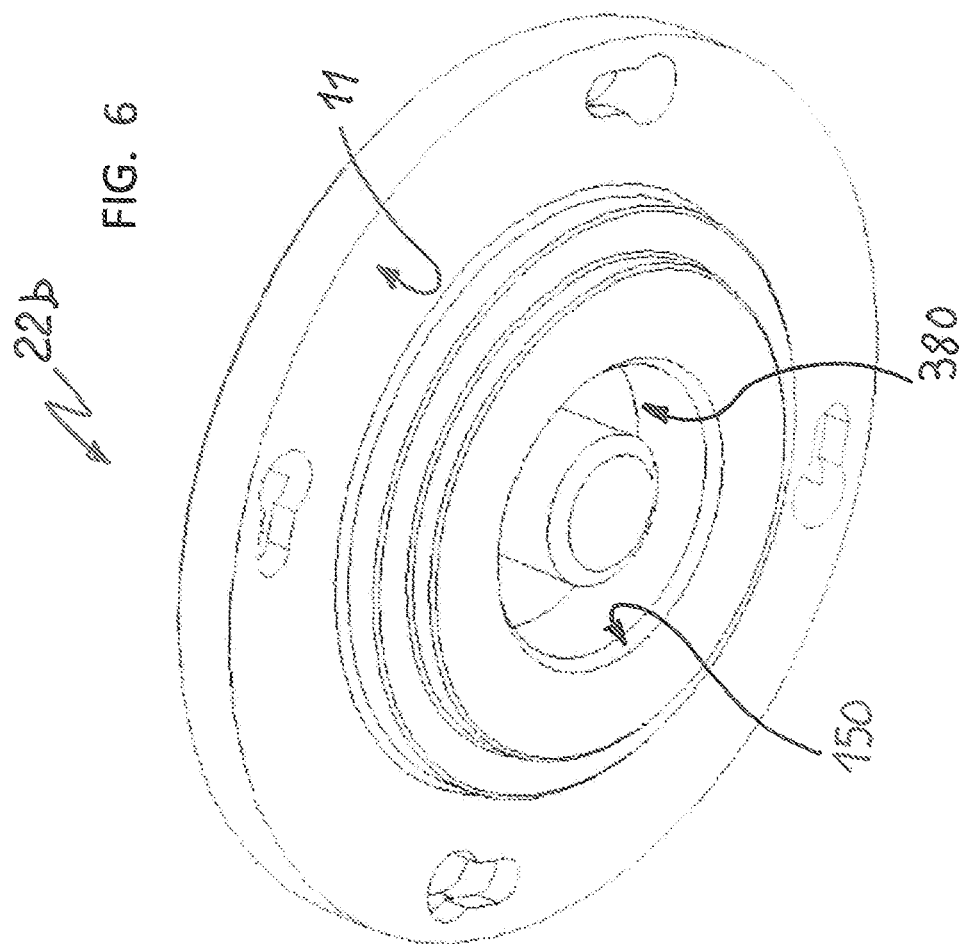
FIG. 6 shows in schematic form a perspective three-quarters view from below of a possible variant of the component illustrated in FIGS. 2-4.

With reference now to FIGS. 6 and 7, these show a plate 22b provided with a second embodiment of the annular seat 15, said annular seat 15 being indicated, for greater clarity, by means of the reference number 150.

Details similar to or the same as those already described are indicated for the sake of simplicity by the same reference numbers.

Annular seat 150 differs from the annular seat 15 already described in that it has a radial profile 40 which extends circumferentially in a uniform manner, but which is configured to "copy" only partly the radial profile 9, precisely along its radially outer and inner peripheral sections.

The radial profile 40 comprises in fact (FIG. 7) a first radially inner section 41 having a shape matching a corresponding first radially inner section of the profile 9 and a second radially outer section 42 having a shape matching a corresponding radially outer section of the profile 9.

The plate 22b is however provided on the side where its first face 11 is situated, instead of with a plurality of seats or slots 38 arranged in a ring-like manner, as in the plate 22, with an annular compartment 380 having the form of a cylindrical crown which axially intercepts the annular seat 20, interrupting it in the circumferential direction between the first section and the second section 41 and 42 of the radial profile 40 thereof.

In this way, the annular compartment 380, during use, immediately faces the third top section 43 of the profile 9 of the collar 10.

In this embodiment, the cutters 20, according to a first solution, are housed side-by-side, axially slidable through the plate 22b, being fully slidable inside the annular compartment 380 without a lateral guide, and the annular compartment 380 therefore extends as far as the inset surface 18.

In a second solution, which is an alternative to the first solution described above, instead, the cutters 20 extend as far as the inside of the annular compartment 380, which extends however only partly within the thickness (distance between the faces 11 and 39) of the plate 22b, from the side where the face 11 is situated, whereas on the side where the face 39 is situated slots 38 (not shown) will be provided for supporting and guiding the cutters 20, said slots being entirely similar to those already described, but shorter and emerging directly inside the annular compartment 380.

In the first solution, for supporting and guiding the cutters 20, advantageously the disc 19, configured as already described, may be used so that the cutters 20 are mounted on the disc 19, slidably and passing through it, said disc being fixed against the second face 39 of the plate 22b.

In this first solution, moreover, the plate 22b (FIG. 7) is divided into a first radially outer portion 44 having an annular shape and into a second central portion 45 having a substantially cylindrical shape and rigidly fastened to the first portion 44 by means of the disc 19 which is fixed by means of screws (not shown for simpler illustration) screwed into blind holes 46 to both of them and which rests on the radially outer edge of the inset surface 18.

In this way, the first portion 44 and the second portion 45 of the plate 22b form and delimit between them the annular compartment 380 in the shape of a cylindrical crown.

Therefore, the concave annular seat 150 formed in the first face 11 of the plate 22b is configured so as to engage, during use, with the collar 10 of the inner ring 3 of the wheel hub 1 so as to contain, during the plastic deformation of the collar 10 following the axial movement relative to the plate 22b of the cutters 20 towards base 31, any radial plastic flow of the metallic material forming the said collar 10.

In both the embodiments, the concave annular seat 15 or 150 formed on the first face 11 of the plate 22 or 22b, respectively, is preferably configured so as to engage, during use, with the collar 10 of the inner ring 3 of the wheel hub 1 with a predefined play, as already seen, but at least in an axial direction with respect to the plate 22/22b, and with a value of this axial play such as to allow, during the plastic deformation of the collar 10 following the axial movement of the cutters 20, a plastic flow of the metallic material forming the collar 10 so as to form on the inner ring a toothing 5 having a height greater than a depth of incision of the cutters on the collar 10.

From the description provided hitherto it is clear that the invention also relates to a method for forming by plastic deformation a front toothing 5 on an inner ring of a wheel hub 1, comprising the steps indicated below.

During a first step, a swaged annular collar 10 having a first radial profile 9 with predefined dimensional and shape characteristics is formed in a known manner, for example by means of orbital forming, on one end 6 of the inner ring 3 of the wheel hub 1.

During a second step, the collar 10 is deformed plastically so as to form frontally thereon the front toothing 5, impressing axially and sequentially on the collar 10 a plurality of cutters 20 guided axially slidable through a rigid plate 22 (or 22b), which plate, before impressing the cutters 20 on the collar 10 is brought into frontal abutment against the said collar 10.

During a third step, according to a main aspect of the invention, containment of any possible radial plastic flow of the metallic material forming the collar 10 is performed.

This third step of containment of the metallic material of the collar 10 is performed simultaneously with the step of plastic deformation of the collar 10 following the axial movement of the cutters 20 relative to the plate 22/22b, providing on the face 11 of the plate 22/22b directed towards the collar 10 a concave annular seat 15 (or 150) having a second radial profile 16 (or 40) configured to copy at least partly the first radial profile 9 of the collar 10.

In both the embodiments, the annular seat 15/150 is configured to be passed through by the cutters 20 during the impression of the said cutters 20 against the collar 10.

Moreover, the wheel hub 1, during the impression of the cutters 20 against the collar 10, is supported locked both axially and radially with respect to an axis A of symmetry thereof on the base 31 arranged facing the plate 22/22b and is furthermore retained with its inner ring 3 angularly locked, so as to not to be able to rotate about the axis B of symmetry of the plate 22/22b arranged coaxial with the axis of symmetry A of the wheel hub 1.

Therefore, the method according to the invention for forming by plastic deformation the toothing 5 comprises firstly the step of forming, by plastic deformation of the end 6 of the inner ring 3, the collar 10, but imparting thereto a first predefined radial profile 9.

In combination with this step, in the method according to the invention the impression of the front toothing 5 on the collar 10 is performed only after the actual step of forming the swaged collar 10, in a temporal sequence following the end of said step for forming the collar 10, directly onto the finished swage collar 10 and actuating the cutters 20 by means of the pressing head 23 so as to impart axially onto the collar 10, in sequence, one or more cutters 20, but performing at the same time at least radial containment of the deformation of the collar 10 owing to the presence of the annular seat 15/150 precisely in the zone where incision of the cutters 20 on the collar 10 occurs.

When the cutters 20 are impressed against the collar 10, the heads 21 come into abutment against the top surface 39 of the plate 22 which in this case must be flat, or, when present, against the flat disc 19, which act as precision end-of-travel stop for the cutters 20.

According to the method of the invention, therefore, the wheel hub 3 is realized in a known manner as an already finished assembly, less the toothing 5, but with the collar 10 already formed.

Thereafter, this semi-finished assembly is rigidly mounted on the base 31 and the front toothing 5 is obtained in the manner described, resulting in a finished wheel hub 1.

The containment effect caused by the presence of the annular seat 15 with a continuous radial profile or annular seat 150 with a radial profile partially interrupted by the annular compartment 380 prevents the metallic material of the collar 10, during the orbital forming step, from flowing in undesirable directions except those necessary for creating the teeth of the front toothing 5, therefore making it possible to obtain teeth which are higher than that which can be obtained in the methods and using the equipment known in the prior art.

The efficiency of containment may be improved by setting the optimum value for the parameters of the orbital forming shape of the collar 10, which may be realized independently of the toothing 5, like the form of the inner ring 3 as deformed/shaped after the end of the operation for orbital forming of the collar 10, in particular the angle formed between the perpendicular to axis A and the part of the profile 43 immediately adjacent to the radially outer section of the profile 9, which may be small, thus obtaining a steeper profile of the inner orbital forming surface of the collar 10.

Owing to the rounded profile of the working edge 25 of the cutters 20, it is possible to round the additional material of the teeth of the toothing 5, creating the rounded tip necessary for avoiding entirely the drawbacks of the prior art described in the introductory part.

The object of the present disclosure is to provide equipment and an associated method for forming by plastic deformation a front toothing on an inner ring of a wheel hub, which are an alternative to the equipment and methods present in the state of the art and which in particular are able to ensure not only a greater dimensional precision of the teeth and a high uniformity in terms of both the dimensions and the geometry of the profile of the said teeth, but which in particular are able to avoid flattening of the tip or crest of the teeth in the normal toothing obtained by means of orbital forming.

Based on the invention, therefore, improved equipment and an associated method for forming by plastic deformation a front toothing on an inner ring of a wheel hub are provided, as defined in the attached claims.

All the objects of the invention are therefore achieved.

The invention claimed is:

1. A device for forming a front toothing on an inner ring of a wheel hub having an inner ring at a first end thereof with an annular collar defining a first radial profile, the device comprising:

a base and a plate having an axis of symmetry (B) and carrying, sliding parallel to the axis of symmetry (B), a plurality of cutters arranged annularly, wherein the plate is mounted on the base and is movable axially along the axis of symmetry (B), and wherein the base is configured to rigidly receive the wheel hub (1) with the inner ring angularly locked and the annular collar facing a first face of the plate directed towards the base, further wherein the first face is provided in a region of said cutters with a concave annular seat having a second radial profile configured to copy at least partly the first radial profile of the collar; the concave annular seat being configured to be passed through by the cutters as a result of sliding thereof in the plate and towards the base.

2. The device of claim 1, wherein the second radial profile of the annular seat comprises a first radially inner section having a shape matching a corresponding first radially inner section of the first profile and a second radially outer section having a shape matching a corresponding second radially outer section of the first profile; the plate being provided on the first face with an annular compartment having the shape of a cylindrical crown and axially intercepting the annular seat interrupting it in a circumferential direction between the first and the second sections of the second profile of the same, so as to be during use immediately facing a third section of the first profile, arranged at the top thereof; the cutters being housed side-by-side, axially slidable through the plate and as far as the inside of the said annular compartment.

3. The device of claim 2, wherein the cutters are slidably mounted on a disc and pass through the disc, said disc being fixed against a second face of the plate, opposite to the first face; wherein the plate is divided into a first, radially outer, annular shaped portion and a second, central, cylindrical shaped portion fastened to the first portion by said disc; the first and second portions and the plate delimiting between them said annular compartment in the shape of a cylindrical crown.

4. The device of claim 1, wherein said concave annular seat formed on the first face of the plate is further configured so as to engage during use with the collar of the inner ring of the wheel hub so as to contain, during plastic deformation of the collar following an axial movement relative to the plate of the cutters towards the base, any radial plastic flow of the metallic material forming the collar.

5. The device of claim 4, wherein the concave annular seat provided on the first face of the plate is configured so as to engage during use with the collar of the inner ring of the wheel hub with a predefined clearance, at least in an axial direction with respect to the plate, so as to allow, during the plastic deformation of the collar following the axial movement of the cutters, a plastic flow of the metallic material forming the collar such as to form on the inner ring a toothing having a height greater than a depth of incision of the cutters on the collar.

6. The device of claim 1, wherein the first face is configured to rest during use, abutting against the inner ring of the wheel hub.

7. The device of claim 1, wherein the second radial profile of the annular seat is configured to copy the first radial profile, which comprises a first radially inner section having a first shape matching a corresponding first radially inner section of the first profile, a second radially outer section having a second shape matching a corresponding second radially outer section of the first profile and a third section arranged so as to connect together the first and second sections and having a shape matching a corresponding third section of the first profile defining a top thereof; wherein the cutters are slidably housed within respective radial slots axially passing through the plate and formed annularly along the third section of the second profile so as to intercept this third section and interrupt at least along it the continuity of the annular seat.

8. The device of claim 1, wherein the cutters define a circumferential profile complementary to that of front toothing to be obtained, so that each cutter is able, when pushed against the inner ring, to form on the inner ring a profile of flanks of two adjacent teeth of the front toothing to be obtained; wherein the device further comprises a pressing head for selectively causing a sequential axial movement of the cutters towards the base and against the collar of the inner ring of a wheel hub arranged locked on the base, after the plate has been arranged against the inner ring.

* * * * *